(12) United States Patent
Honda et al.

(10) Patent No.: US 9,738,188 B2
(45) Date of Patent: Aug. 22, 2017

(54) MOTOR VEHICLE ARMREST

(71) Applicant: HONDA MOTOR CO., LTD., Tokyo (JP)

(72) Inventors: Takashi Honda, Wako (JP); Takeshi Fujimaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 7 days.

(21) Appl. No.: 15/094,344

(22) Filed: Apr. 8, 2016

(65) Prior Publication Data
US 2016/0311349 A1 Oct. 27, 2016

(30) Foreign Application Priority Data

Apr. 22, 2015 (JP) ................................. 2015-087456

(51) Int. Cl.
| | | |
|---|---|---|
| *B60N 2/46* | (2006.01) | |
| *B60N 2/42* | (2006.01) | |
| *B60R 21/207* | (2006.01) | |
| *B60R 21/04* | (2006.01) | |

(52) U.S. Cl.
CPC ......... *B60N 2/4626* (2013.01); *B60N 2/4235* (2013.01); *B60N 2/4606* (2013.01); *B60N 2/4633* (2013.01); *B60R 21/04* (2013.01); *B60R 21/207* (2013.01); *B60R 2021/0407* (2013.01)

(58) Field of Classification Search
CPC .. B60N 2/4235; B60N 2/4626; B60N 2/4606; B60N 2/4633; B60R 21/207; B60R 21/23138; B60R 21/04
USPC ........................................................ 297/216.1
See application file for complete search history.

(56) References Cited

U.S. PATENT DOCUMENTS

| | | | | | |
|---|---|---|---|---|---|
| 3,981,518 | A | * | 9/1976 | Pulling | ................ B60N 2/4221 297/216.1 |
| 5,730,458 | A | * | 3/1998 | Byon | .................... B60R 21/207 280/730.2 |
| 8,485,551 | B2 | * | 7/2013 | Dainese | ................ B60R 21/207 297/216.13 |
| 2002/0063453 | A1 | * | 5/2002 | Terry | ........................ A47C 7/38 297/227 |
| 2014/0001799 | A1 | * | 1/2014 | Kalisz | ................... B60R 21/207 297/216.1 |

FOREIGN PATENT DOCUMENTS

| | | |
|---|---|---|
| JP | H1-70645 U | 5/1989 |
| JP | 2003220913 A | 8/2003 |

* cited by examiner

*Primary Examiner* — Anthony D Barfield
(74) *Attorney, Agent, or Firm* — Chip Law Group

(57) ABSTRACT

A motor vehicle armrest includes an armrest body that is disposed on at least one side in a vehicle-width direction of a seat cushion so as to support of an arm of an occupant. The armrest body has an inflation portion that is inflated toward the occupant in the vehicle-width direction so as to support the occupant in the vehicle-width direction.

4 Claims, 4 Drawing Sheets

MOTOR VEHICLE ARMREST

CROSS REFERENCES TO RELATED APPLICATIONS

The present application claims priority under 35 U.S.C. §119 to Japanese Patent Application No. 2015-087456, filed Apr. 22, 2015, entitled "Motor Vehicle Armrest." The contents of this application are incorporated herein by reference in their entirety.

BACKGROUND

1. Field

The present disclosure relates to a motor vehicle armrest.

2. Description of the Related Art

To date, motor vehicles have been equipped with armrests that protect arms of occupants seated in their seats. From, for example, Japanese Unexamined Utility Model (Registration) Application Publication No. 1-70645, there is known an armrest that has a bag for containing a fluid and that changes the thickness of the bag by causing a fluid to go into the bag and thereby adjusts the height of the armrest.

In addition, an armrest disclosed in Japanese Unexamined Patent Application Publication No. 2003-220913 has a structure in which a cushioning material is covered with a wrapping material and that opposes a region from the waist to the abdomen of an occupant of a vehicle. With this arrangement, an incoming side impact load is said to be absorbed by the cushioning material in the event of a side crash of the vehicle.

However, the armrests described above need to be improved because of a problem with the attitude stability in the vehicle-width direction of the occupant during, for example, turning or other normal operations.

SUMMARY

The present application describes a motor vehicle armrest that can improve attitude stability of an occupant in the vehicle-width direction.

A first aspect of the present application provides a motor vehicle armrest (for example, an armrest 5 in an embodiment) having an armrest body (for example, armrest bodies 11A, 11B in the embodiment) that is disposed on at least one side in a vehicle-width direction of a seat cushion (for example, a seat cushion 2 in the embodiment) so as to support an arm of an occupant, in which the armrest body has an inflation portion (for example, an inflation portion 22 in the embodiment) that is inflated toward the occupant in the vehicle-width direction so as to support the occupant in the vehicle-width direction. With this arrangement, the occupant can be prevented from getting out of a proper position in the vehicle-width direction during, for example, turning or other normal operation of the vehicle whereby the attitude stability of the occupant can be improved, which results in enhanced riding comfort.

A second aspect of the present application provides the motor vehicle armrest in which the armrest body may be disposed on each side in the vehicle-width direction of the seat cushion. With this arrangement, the occupant can be supported from both sides. This improves the attitude stability as well as the riding comfort of the occupant.

A third aspect of the present application provides the motor vehicle armrest in which the armrest body disposed on the side of a door opening (for example, a door opening 6 in the embodiment) may have a side impact load reducing portion (for example, a padding material 21 in the embodiment) that protects the occupant against an impact coming from a side of the vehicle and in which the armrest body disposed on the opposite side of the seat cushion from the door opening may overlap the occupant in side view as seen from the vehicle-width direction and may be movable between a use position at which the armrest body supports the arm of the occupant and a stowed position at which the armrest body does not overlap the occupant. With this arrangement, the occupant can move the armrest body in accordance with the occupant's preference. When put in the stowed position, the armrest body does not overlap the occupant in side view as seen from the vehicle-width direction, creating a space on the opposite side of the seat cushion from the door opening. This can satisfy both of safety against a vehicle crash and interior comfort of the passenger compartment.

A fourth aspect of the present application provides the motor vehicle armrest in which the armrest body disposed on the side of the door opening may be movable between the use position at which the armrest body protrudes above the seat cushion so as to support the arm of the occupant and the stowed position that is located below the use position. With this arrangement, the occupant can move the armrest body in accordance with the occupant's preference. When put into the stowed position, the armrest body is disposed below the use position, enabling the occupant to enter and exit the vehicle through the armrest body. In other words, the armrest body provides support for the occupant entering and exiting the vehicle, thereby improving the convenience of the occupant.

DESCRIPTION OF THE PREFERRED EMBODIMENTS

An embodiment of the present application will be described below with reference to the attached drawings. Described below is a motor vehicle armrest (hereinafter referred to as "armrest" for short) that is mounted in a driver's seat of a motor vehicle. In this description, references to "front", "rear", "upside", "downside", "right", and "left" of the vehicle are relative to the position of the driver in the drivers seat, unless otherwise noted. In addition, arrows denoted by "UP" and "FR" in the figures refer to upward and forward directions, respectively.

First Embodiment

Figure 1:
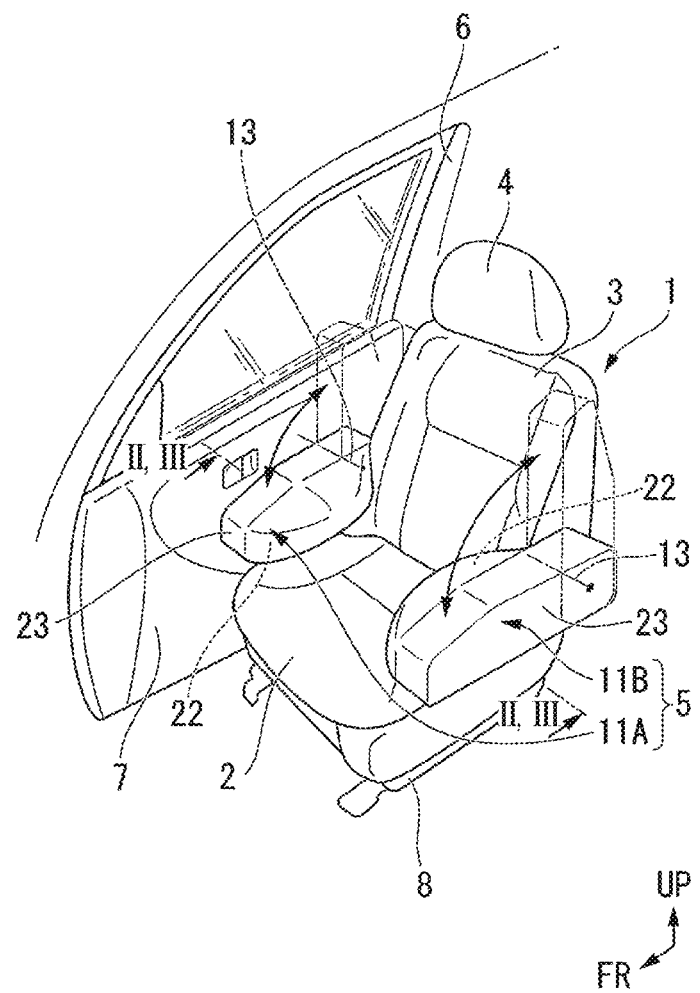
FIG. 1 is a perspective view of a driver's seat as seen from the front, explaining an armrest according to a first embodiment of the present application.

FIG. 1 is a perspective view of a driver's seat 1 of a vehicle. The seat 1 shown in FIG. 1 is provided with a seat cushion 2, a seat back 3 tiltably coupled to a rear end of the seat cushion 2, a head rest 4 supported on the top of the seat back 3, and an armrest 5 disposed on a side of the seat cushion 2. A component indicated by a numeral "6" in FIG. 1 is a door opening through which an occupant of the vehicle enters and exits and which is opened and closed by a front side door 7.

The seat cushion 2 supports a region ranging from the buttocks to the thigh of the occupant from below and is supported on a vehicle floor via a seat rail 8 so as to be longitudinally slidable. The seat back 3 supports a region from the lumber to the back of the occupant from the rear and is longitudinally tiltable whereby its angle is adjusted relative to the seat cushion 2. The head rest 4 supports the head of the occupant and is mounted on the seat back 3 so as to be liftable.

The armrest 5 supports the arms of the occupant and includes a pair of armrest bodies 11A, 11B disposed on both sides of the seat cushion 2 in a vehicle-width direction. In descriptions about the armrest bodies 11A, 11B that follow, components with the same reference numerals and symbols refer to those having the same configuration. In addition, a direction toward the center of the seat 1 in the vehicle-width direction is defined as an inner side in a seat-width direction, while a direction opposite to a direction toward the center of the seat 1 is defined as an outer side in the seat-width direction.

The armrest bodies 11A, 11B extend forward from the seat back 3 in the form of a cantilever and are supported on the seat back 3 at their base ends (or rear ends) so as to be rotatable around a rotating shaft 13 extending in a seat-width direction. Specifically, the armrest bodies 11A, 11B are rotatable between a use position (indicated by solid lines in FIG. 1) at which the armrest bodies 11A, 11B extend horizontally forward from the seat back 3 and a stowed position (indicated by dot-dash lines in FIG. 1) at which the armrest bodies 11A, 11B are raised at their tips (or front ends) so as to extend upright in parallel with the seat back 3. In other words, when viewed in side view as seen from the seat-width direction, the armrest bodies 11A, 11B, are configured to overlap the occupant when put in the use position and not overlap the occupant when put in the stowed position. In addition, the armrest bodies 11A, 11B are configured to be rotatable independently of each other. Furthermore, the armrest bodies 11A, 11B are configured to be lockable at least at the use position by a lock mechanism (not illustrated).

The armrest bodies 11A, 11B, when put in the use position, oppose a region from the lumber to the thigh of the occupant seated in the seat 1 in the seat-width direction. In this embodiment, the armrest bodies 11A, 11B may be provided at a height at which each of the armrest bodies 11A, 11B opposes the iliac bone of at least an adult human in the seat-width direction. The height of the iliac bone is based on the average height of, for example, the iliac bone of a Japanese person or the height of the iliac bone of a crash-test dummy (for example, AM95). However, when the occupant is seated, the height of an adult human's iliac bone above the seat cushion 2 is constant, regardless of the occupant's height.

Figure 2:
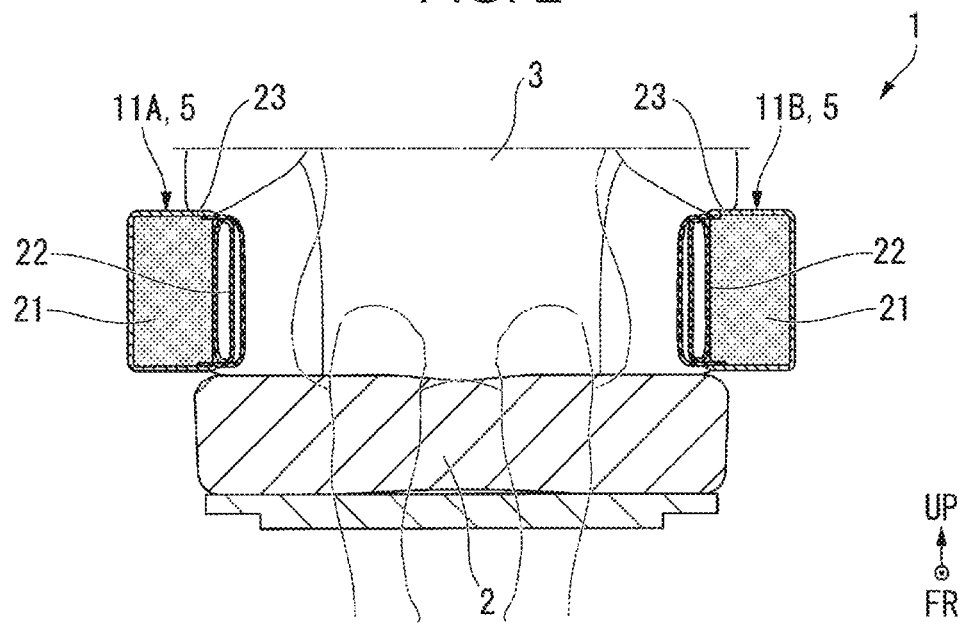
FIG. 2 is a cross-sectional view taken along line II-II of FIG. 1, depicting an inflation portion in a deflated state.
Figure 3:
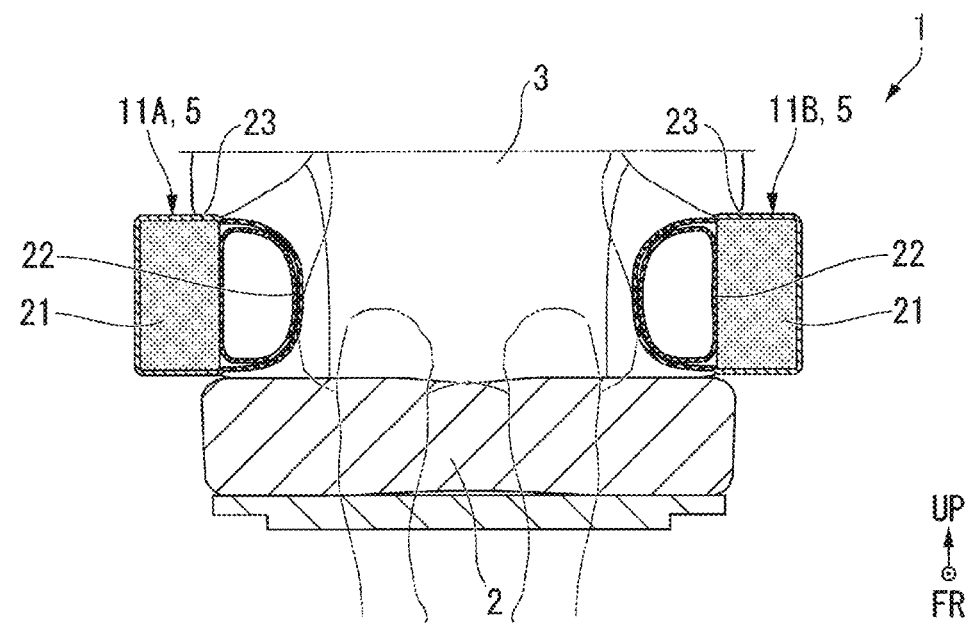
FIG. 3 is a cross-sectional view taken along line of FIG. 1, depicting an inflation portion in an inflated state.

FIGS. 2 and 3 are cross-sectional views taken along lines II-II and III-III of FIG. 1. FIG. 2 shows an inflation portion 22 in a deflated state (in which the inflation portion 22 is not inflated). FIG. 3 shows the inflation portion 22 in an inflated state. As shown in FIGS. 2 and 3, each of the armrest bodies 11A, 11B has a padding material (side impact load reducing portion) 21, the inflation portion 22 disposed on the inner side in the seat-width direction of the padding material 21, and a skin 23 that covers the padding material 21 and the inflation portion 22. The padding material 21 includes urethane foam or the like shaped in the form of a rectangular column and covers an armrest frame (not illustrated), making the external forms of the armrest bodies 11A, 11B. The padding material 21, when the armrest 5 is in the use position, opposes a region (hereinafter referred to as "support region") from the lumber to the buttocks of the occupant in the seat-width direction and protects the occupant by absorbing a side impact load.

The inflation portion 22 is a bag-like component that is disposed on the inner side in the seat-width direction of the padding material 21. The inflation portion 22 is inflated or deflated in the seat-width direction by means of a fluid supplied from an air or other fluid supply source (not illustrated) so as to be able to come into contact with and move away from the support region of the occupant in the seat-width direction. The right-hand and left-hand inflation portions 22 of the armrest bodies 11A, 11B in the inflated state shown in FIG. 3 hold the support region of the occupant therebetween from both sides in the seat-width direction, thereby supporting the occupant in the seat-width direction. In an example shown in FIG. 3, the inflation portions 22 are inflated in such a manner that their centers in the vertical direction are located innermost in the seat-width direction. The inflation portions 22 in the deflated state shown in FIG. 2 may be folded in the form of, for example, bellows before being disposed.

A flow rate (or pressing force acting on the occupant) of the fluid supplied to the inflation portions 22 may be adjusted manually. Alternatively, a pressure sensor or the like may be used to detect the inner pressure of the inflation portions 22 and, when the inner pressure reaches a predetermined threshold, the fluid supply may be automatically deactivated. Portions of the above-mentioned skin 23 that cover at least the inflation portions 22 are configured to be able to expand and shrink in conjunction with the inflation and deflation of the inflation portions 22.

As shown in FIG. 2, when a fluid is supplied to the inflation portions 22 with the occupant seated in the seat 1, the inflation portions 22 are inflated toward the inner side in the seat-width direction, which reduces the clearance between the occupant and the inflation portions 22. After that, the inflation portions 22 are further inflated, which causes the inflation portions 22 to come into contact with the support regions of the occupant from the outside in the seat-width direction. As a result, the support regions ranging from the lumber to the thigh of the occupant are pressed toward the inner side in the seat-width direction, as shown in FIG. 3, resulting in the occupant being held in place by the seat 1.

Accordingly, in this embodiment, the inflation portions 22 inflating toward the inner side in the seat-width direction can support the occupant in the seat-width direction. This can prevent the occupant from getting out of a proper position in the seat-width direction during, for example, turning or other normal operation of the vehicle whereby the attitude stability of the occupant can be improved, which results in enhanced riding comfort.

In addition, in this embodiment, the armrest bodies 11A, 11B are disposed on both sides of the seat cushion 2 in the seat-width direction whereby the occupant can be supported from both sides. This improves the attitude stability as well as riding comfort of the occupant.

Furthermore, in this embodiment, the armrest bodies 11A, 11B are rotatable between the use position and the stowed position whereby the occupant can move the armrest bodies 11A, 11B in accordance with the occupant's preference. When put in the stowed position, the armrest bodies 11A, 11B, do not overlap the occupant in side view as seen from the seat-width direction, creating a space on the opposite side of the seat 1 from the door opening in the vehicle-width direction. This can satisfy both safety against a vehicle crash and interior comfort of the passenger compartment.

[Modification]

Figure 4:
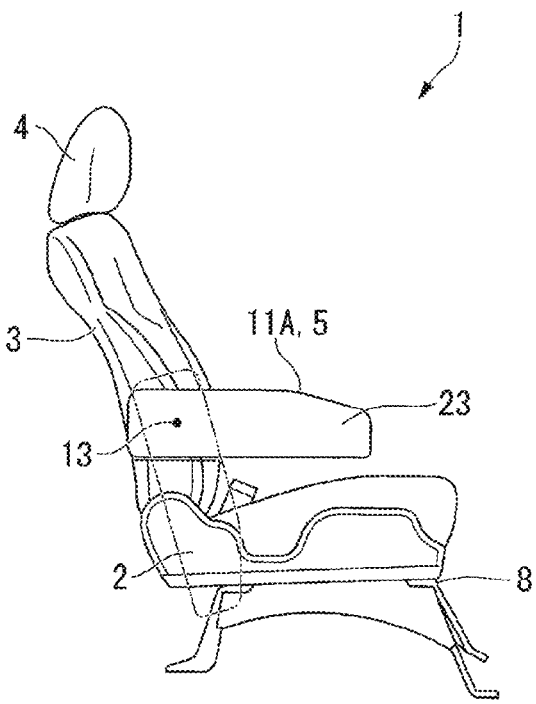
FIG. 4 is a side view of a seat, explaining an armrest according to a modification of a first embodiment.

In the embodiment described above, a method for switching the armrest bodies 11A, 11B from the use position to the stowed position includes rotating the armrest bodies 11A, 11B upward about the rotating shaft 13, but is not limited to this. For example, as shown in FIG. 4, the armrest bodies 11A, 11B may be configured to be switched from the use position to the stowed position by allowing the armrest bodies 11A, 11B to be rotated downward about the rotating shaft 13.

Second Embodiment

Figure 5:
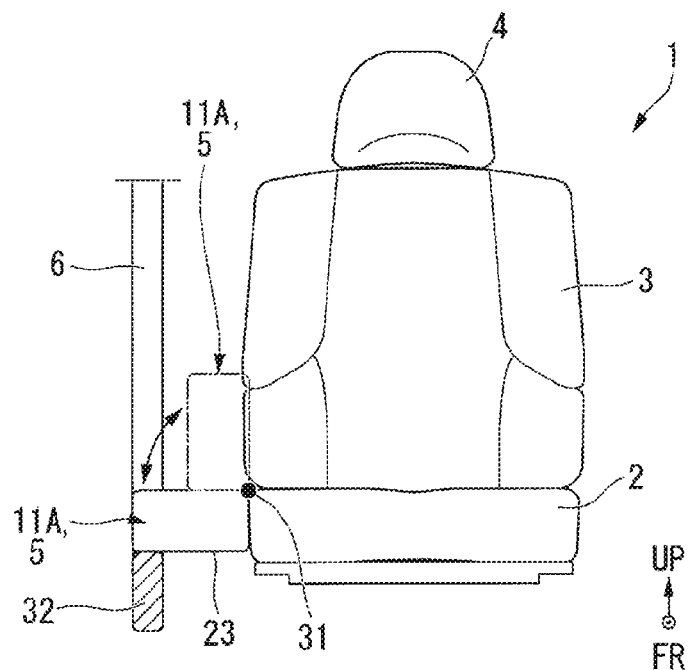
FIG. 5 is a front view of a seat as seen from the front, explaining an armrest according to a second embodiment of the present application.

Next, a second embodiment of the present application will be described below. FIG. 5 is a front view of a seat 1 as seen from the front, explaining an armrest 5 according to a second embodiment. As shown in FIG. 5, in this embodiment, an armrest body 11A on the side of the door opening 6 is mounted on the seat cushion 2 so as to be rotatable around a rotating shaft 31 extending in the longitudinal direction. Specifically, the armrest body 11A is rotatable between a use position at which the occupant's arm can be placed on the armrest and a stowed position at which the inflation portion 22 faces upward after the armrest body 11A is rotated from the use position to the outer side in the seat-width direction. The armrest body 11A, when put in the stowed position, makes a bridge between the seat cushion 2 and a step garnish 32 defining the door opening 6 in such a manner that the inflation portion 22 is arranged at the same height as that of the seat cushion 2.

In addition to the same effect as in the first embodiment, this arrangement produces another effect that the occupant can enter and exit the vehicle through the armrest body 11A put into the stowed position. In other words, the armrest body 11A provides support for the occupant entering and exiting the vehicle, thereby improving the convenience of the occupant.

[Modification]

Figure 6:
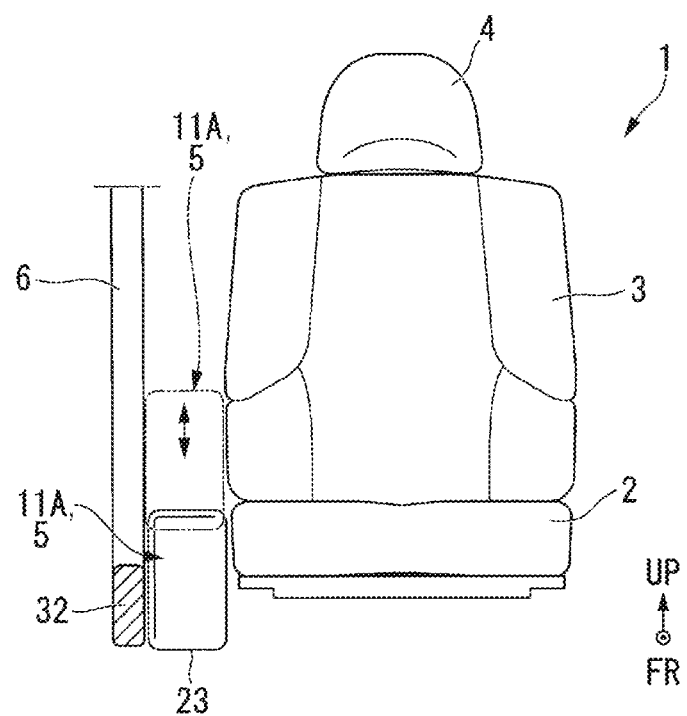
FIG. 6 is a front view corresponding to FIG. 5, explaining an armrest according to a second embodiment of the present application.

In the second embodiment described above, a method for switching the armrest body 11A from the use position to the stowed position includes rotating the armrest body 11A toward the outer side in the seat-width direction around the rotating shaft 31, but is not limited to this. For example, as shown in FIG. 6, the armrest body 11A may be configured to be switched from the use position to the stowed position by allowing the armrest body 11A to be moved vertically. In this case, when put in the stowed position, the armrest body 11A has the same height at its top surface as the seat cushion 2, making a bridge between the seat cushion 2 and the step garnish 32. This provides support for the occupant entering and exiting the vehicle, thereby improving the convenience of the occupant. The armrest body 11A, when put in the use position, may protrude upward from the seat cushion 2 to enable the occupant's arm to be placed thereon, while the armrest body 11A, when put in the stowed position, may be located lower than when put in the use position. In other words, the height of the armrest body 11A put in the stowed position relative to the seat cushion 2 is adjustable when necessary.

The present application is typically described with reference to, but not limited to, the foregoing embodiments. Various modifications are conceivable within the scope of the present application. For example, the armrest bodies 11A, 11B are disposed on both sides in the vehicle-width direction of the seat cushion 2 in the embodiments described above, but one of the armrest bodies 11A, 11B may be disposed on at least one side in the vehicle-width direction. In addition, each of the armrest bodies 11A, 11B has one inflation portion 22 disposed thereon in the embodiment described above, but may have more than one inflation portion 22. In this case, their flow rate may be adjusted among more than one inflation portion 22.

The armrest bodies 11A, 11B are provided with the padding material 21 as a side impact load reducing portion in the embodiments described above, but may be provided with an airbag or the like. In addition, the armrest bodies 11A, 11B are disposed so as to oppose the iliac bone of an adult human in the seat-width direction in the embodiment described above, but may be disposed in such a manner that at least the inflation portion 22 opposes the iliac bone of an adult human in the seat-width direction.

In addition, the armrest bodies 11A, 11B may be configured to enable a supply of a fluid to the inflation portions 22 when put in the use position and to disable a supply of a fluid to the inflation portions 22 or discharge a fluid from the inflation portion 22 when put in the stowed position. Furthermore, the foregoing embodiments have been described by way of an example of the inflation portions 22 that are configured to be inflated to the inner side in the seat-width direction when receiving a supply of a fluid, but not limited to this. In addition, the foregoing embodiments have been described by way of an example of the inflation portions 22 that are configured to be inflated in such a manner that their centers in the vertical direction are located innermost in the seat-width direction, but not limited to this.

The armrest according to the present application is used in the driver's seat 1 in the embodiments described above, but may be used in other seats of the vehicle. In addition, the armrest according to this present application may be provided as a combined armrest and console that has the function of a console disposed between the driver's seat and a front passenger seat.

The foregoing embodiments have been described by way of an example of the armrest bodies 11A, 11B that are mounted on the seat cushion 2 or the seat back 3, but not limited to this. As long as the armrest bodies 11A, 11B are disposed at the sides of the seat 1, their mounting method may be modified when necessary. In addition, a door trim armrest may or may not be provided in addition to the armrest bodies 11A, 11B according to the present application. If no door trim armrest is provided, power window switches or other controls may be disposed on the top face of the armrest bodies 11A, 11B.

What is claimed is:

1. A motor vehicle armrest, comprising:
    an armrest body that is disposed on at least one side of a seat cushion, in a vehicle-width direction, so as to support an arm of an occupant of a motor vehicle;
    a padding material provided in the armrest body; and
    an inflation portion, provided in the armrest body, that is disposed on an inner side of the padding material in the vehicle-width direction,
        wherein the inflation portion is inflatable, in a direction toward the occupant, in the vehicle-width direction such that a support region ranging from a lumber to a thigh of the occupant is pressed toward a center of the seat cushion in the vehicle-width direction.

2. The motor vehicle armrest according to claim 1, wherein the armrest body is disposed on each side of the seat cushion, in the vehicle-width direction.

3. The motor vehicle armrest according to claim 2, wherein the armrest body disposed on a side of a door opening has a side impact reducing load portion that protects the occupant against an impact coming from the side of the vehicle; and wherein the armrest body disposed on an opposite side of the seat cushion from the door opening overlaps the occupant in side view as seen from the vehicle-width direction and is movable between a use position, at which the armrest body supports the arm of the occupant, and a stowed position at which the armrest body unsupports the occupant.

4. The motor vehicle armrest according to claim 1, wherein the armrest body disposed on a side of a door opening is movable between a use position, at which the armrest body protrudes above the seat cushion so as to support the arm of the occupant, and a stowed position that is located below the use position.

* * * * *